United States Patent
Wan et al.

(10) Patent No.: US 11,654,579 B2
(45) Date of Patent: May 23, 2023

(54) GRABBING DEVICE

(71) Applicant: Suzhou Dituan Robot & Automation Co., Ltd., Suzhou (CN)

(72) Inventors: Xinfei Wan, Suzhou (CN); Wenzhong Kai, Suzhou (CN); Haibo Zhi, Suzhou (CN)

(73) Assignee: Suzhou Diu-an Robot & Automation Co., Ltd., Suzhou (CN)

( * ) Notice: Subject to any disclaimer, the term of this patent is extended or adjusted under 35 U.S.C. 154(b) by 300 days.

(21) Appl. No.: 17/256,557

(22) PCT Filed: Apr. 18, 2019

(86) PCT No.: PCT/CN2019/083130
§ 371 (c)(1),
(2) Date: Dec. 28, 2020

(87) PCT Pub. No.: WO2020/048136
PCT Pub. Date: Mar. 12, 2020

(65) Prior Publication Data
US 2021/0252719 A1    Aug. 19, 2021

(30) Foreign Application Priority Data
Sep. 3, 2018 (CN) .......................... 201811019336.7

(51) Int. Cl.
*B25J 15/00* (2006.01)

(52) U.S. Cl.
CPC ....... *B25J 15/0023* (2013.01); *B25J 15/0033* (2013.01)

(58) Field of Classification Search
CPC .......................... B25J 15/0023; B25J 15/0033
See application file for complete search history.

(56) References Cited

U.S. PATENT DOCUMENTS 9,925,672 B2 *  3/2018  Nakayama ............. B25J 19/023
10,005,191 B2 *  6/2018  Takikawa ............. B25J 15/0004
(Continued)

FOREIGN PATENT DOCUMENTS

CN       103341861 A      10/2013
CN       105818143 A       8/2016
(Continued)

OTHER PUBLICATIONS

English translation of Written Opinion and International Search Report in PCT Application No. PCTCN2019083130; 9 pages.
(Continued)

*Primary Examiner* — Stephen A Vu
(74) *Attorney, Agent, or Firm* — Peter L. Brewer; Thrive IP

(57) ABSTRACT

A grabbing device, comprising a connection base, a gas pipeline provided in the connection base, a grabbing member having a hollow cavity and connected to the connection base, a filter layer provided between the hollow cavity and the gas pipeline, and particles filled in the hollow cavity. The gas pipeline is in communication with the hollow cavity by the filter layer for preventing the particles from entering the gas pipeline. The grabbing member is made of a flexible material, permitting the grabbing member to bulge when being inflated, and being recessed according to a shape of a surface of the object after the grabbing member contacts the object. The particles maintain the flexible state when the grabbing member is inflated, and the particles are pressed to the rigid state when withdrawing gas to deflate the grabbing member into a recessed position. The grabbing device can maintain a grip on objects having an irregular shape.

7 Claims, 2 Drawing Sheets

(56) References Cited

U.S. PATENT DOCUMENTS

| | | | |
|---|---|---|---|
| 10,046,462 B2* | 8/2018 | Knopf | B25J 15/0023 |
| 10,286,560 B1* | 5/2019 | Hwang | B25J 15/12 |
| 10,308,038 B2* | 6/2019 | Hoover | B25J 15/0616 |
| 2013/0106127 A1* | 5/2013 | Lipson | B25J 15/0023 |
| | | | 294/189 |

FOREIGN PATENT DOCUMENTS

| | | | |
|---|---|---|---|
| CN | 105881564 A | 8/2016 | |
| CN | 108994865 A | 12/2018 | |
| CN | 208663840 U | 3/2019 | |
| DE | 102007030036 A1 | 1/2009 | |
| WO | 2020048136 A1 | 3/2020 | |

OTHER PUBLICATIONS

English translation of CN 108994865; 7 pages.
English translation of CN 208663840; 7 pages.
English translation of CN 103341861; 5 pages.
English translation of CN 105881564; 5 pages.
English translation of CN105818143; 7 pages.
English translation of DE 102007030036; 4 pages.
Untranslated Written Opinion in PCT Application No. PCTCN2019083130; 4 pages.

* cited by examiner

GRABBING DEVICE

CROSS REFERENCE TO RELATED APPLICATIONS

This application claims the benefit of CN 201811019336.7 filed Sep. 3, 2018. That application is titled "Grabbing Device."

This application also claims the benefit of PCT/CN2019/083130 filed Apr. 18, 2018. That application is titled "Grabbing Device."

Each of these applications in incorporated herein in its entirety by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

TECHNICAL FIELD OF THE INVENTION

The present disclosure relates to a grabbing device.

BACKGROUND OF THE INVENTION

The existing grabbing members cooperating with mechanical arms for grabbing objects generally comprise rigid fingers or flexible fingers, wherein the rigid fingers have greater grasping force, but are likely to cause damage to the surface of objects; while the flexible fingers can avoid this problem well, but have smaller grasping force. These two kinds of grabbing members are generally suitable for grabbing regular-shaped objects, and for which it is difficult to grab irregular-shaped objects.

SUMMARY OF THE INVENTION

The purpose of the present disclosure is to provide a grabbing device which can grab regular-shaped objects, but can also grab various of irregular-shaped objects, and has a good grabbing effect.

To achieve the above purpose, the technical solution employed by the present disclosure is:

A grabbing device, for grabbing an object, comprises: a connection base, a gas pipeline provided in the connection base, a grabbing member having a hollow cavity and connected to the connection base, a filter layer provided between the hollow cavity and the gas pipeline, and particles filled in the hollow cavity and capable of flow in the hollow cavity, wherein the gas pipeline is in communication with the hollow cavity by the filter layer for preventing the particles from entering the gas pipeline;

the grabbing member is made of a flexible material, for being bulge when being inflated, and being recessed according to a shape of a surface of the object after the grabbing member contacts the object;

the particles have a flexible state and a rigid state, and the particles maintain the flexible state when the grabbing member is inflated, and the particles are pressed to the rigid state when deflating gas after the grabbing member is recessed.

In some embodiments, the grabbing member is spherical.

In some embodiments, the grabbing member is made of silica gel material.

In some embodiments, the particles are low-density micro-sized particles.

In some embodiments, the particles are low-friction micro-sized particles.

In some embodiments, the surface of the grabbing member is provided with patterns for increasing frictional force of grasping.

In some embodiments, the filter layer is a filter diaphragm.

In some embodiments, the connection base comprises a connection flange, a connection lid, a connection cover which are successively connected, the grabbing member is partially located in the connection cover and the connection lid, and the filter layer is in the connection lid.

In some embodiments, the connection base further comprises a pressure ring provided in the connection lid for fixing the filter layer.

Due to the use of the above technical solutions, the present disclosure has the following advantages over the prior art: by providing the grabbing member recessed and deformable correspondingly according to the shape of the surface of the object, and providing the particles capable of flow in the hollow cavity having a rigid state after being squeezed and compressed in the hollow cavity of the grabbing member, the grabbing device of the present disclosure can maintain a good gripping effect on various irregular objects by the shape constraint provided by the grabbing member surface and the gripping force provided by the particles in the rigid state.

Wherein, 1—gas pipeline; 2—grabbing member; 3—hollow cavity; 4—filter layer; 5—connection flange; 6—connection lid; 7—connection cover; 8—pressure ring.

DETAILED DESCRIPTION OF EXEMPLARY EMBODIMENTS

In the following, the technical solution of the present disclosure is further described in view of the accompanying drawings.

Figure 1:
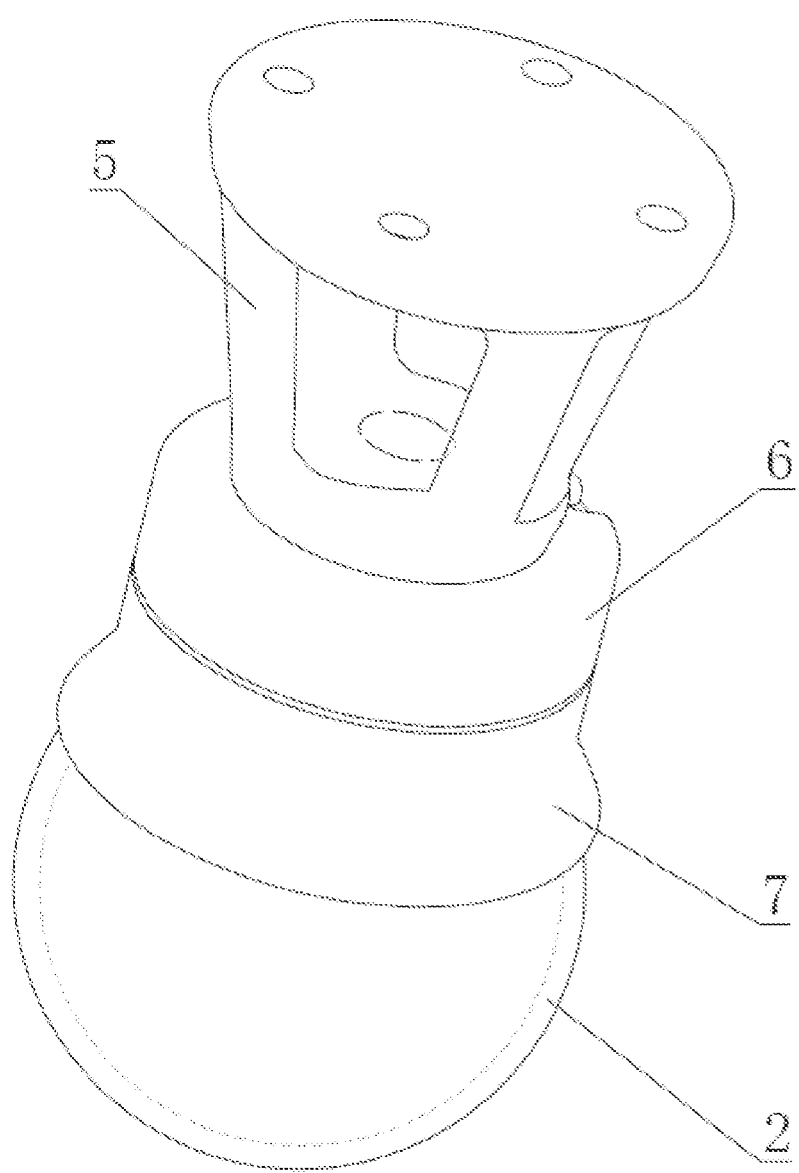
FIG. 1 is a schematic structure diagram of the device of an embodiment according to the present disclosure.
Figure 2:
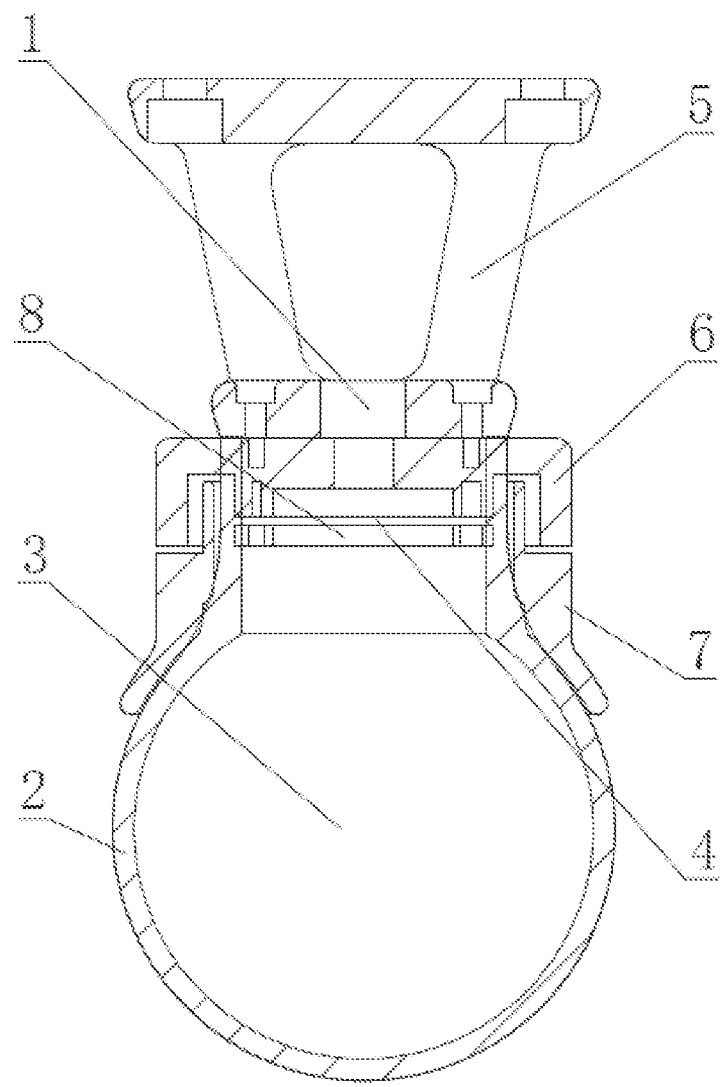
FIG. 2 is a section view of the device of an embodiment according to the present disclosure.

Referring to FIGS. 1-2, a grabbing device for grabbing an object, comprises a connection base for connecting a mechanical arm. The mechanical arm controls actions such as rising, falling, forwarding, backwarding, rotating, etc., of the connection base.

The above grabbing device further comprises a gas pipeline 1 provided in the connection base, a grabbing member 2 having a hollow cavity 3 and connected to the connection base, a filter layer 4 provided between the hollow cavity 3 and the gas pipeline 1, and particles filled in the hollow cavity 3 and capable of flow in the hollow cavity 3. The gas pipeline 1 is in communication with the hollow cavity 3 by the filter layer 4, and the filter layer 4 is used for preventing the particles from being suctioned into the gas pipeline 1. The hollow cavity 3 is inflated or deflated via the gas pipeline 1.

The grabbing member 2 is made of a flexible material. In the present embodiment, the grabbing member 2 is made of silica gel material, and a portion of the grabbing member 2 in the outside of the connection base is spherical. The particles are micro-sized particles with a low density and low friction characteristics, and in the present embodiment, the particles have a flexible state and a rigid state.

The flexible material of the grabbing member 2 enables the grabbing member 2 to bulge when being inflated, and at this moment, the particles are filled in the entire hollow cavity 3, and are in a flexible state; the grabbing member 2 is to be recessed according to the shape of the surface of the object after the grabbing member 2 contacts the object, and at this moment, the particles are filled in the recess of the surface of the grabbing member 2 due to that the particles can flow in the hollow cavity, such that the grabbed object is generally encapsulated by the grabbing material and the particles around, and when the hollow cavity is vacuumed, the particles are squeezed and compressed into a rigid state by the deformation of the grabbing member 2, such that the flexible contact of the grabbing member 2 on the object turns into rigid contact and rigid grabbing, which greatly improves the gripping force of the grabbing member 2, and can maintain a good clamping and gripping effect on various irregular objects. Due to that the grabbing member 2 is in flexible contact with the object when it is inflated, it is able to perform a relatively conformable deformation to contact various irregular and abnormal shaped objects, and able to be embedded in the recess or gap on the surface of the irregular objects, in this way, when the grabbing member 2 is deflated, it contracts into rigid contact with the objects, and is able to firmly grip the objects.

The surface of the grabbing member 2 is provided with patterns for increasing the frictional force of grabbing, and by this configuration, the frictional force between the grabbing member 2 and the object is increased, and the clamping and gripping effect is improved.

In the present embodiment, the connection base comprises a connection flange 5, a connection lid 6, a connection cover 7 which are successively connected, and the grabbing member 2 is partially located in the connection cover 7 and the connection lid 6. The filter layer 4 is a filter diaphragm which is located in the connection lid 6, and the connection base further comprises a pressure ring 8 provided in the connection lid 6 for fixing the filter layer 4, and the press ring 8 is not only used for fixing the filter diaphragm, but also used for stretching the filter diaphragm.

The working process of the present embodiment is specifically described below.

Firstly, the hollow cavity 3 is inflated through the gas pipeline 1, so that the grabbing member 2 is inflated and remains spherical, and at this moment, the particles flow to fill the entire hollow cavity 3.

Then, the grabbing member 2 contacts the object, and is recessed according to the shape of the surface of the object after being contacted with the object surface by virtue of the fact that the grabbing member 2 is made of a flexible material, at this moment, the particles are filled in the recess of the surface of the grabbing member 2 due to particles flowing into the hollow cavity 3, such that the grabbed object is filled with such particles around.

Finally, the hollow cavity 3 is vacuumed via the gas pipeline 1 to continue deforming the grabbing member 2, the particles are squeezed and compressed into the rigid state by the deformation of the grabbing member 2, such that the object can be firmly grabbed.

The embodiments described above are only for illustrating the technical concepts and features of the present disclosure, and are intended to make those skilled in the art able to understand the present disclosure and thereby implement it, and should not be construed as limiting the scope of the claims, which follow. Any equivalent variations or modifications according to the spirit of the present disclosure should be covered by the claims of the present disclosure.

What is claimed is:

1. A grabbing device for grabbing an object, comprising:
   a connection base,
   a gas pipeline provided in the connection base,
   a grabbing member having a hollow cavity and connected to the connection base,
   a filter layer provided between the hollow cavity and the gas pipeline, and particles filled in the hollow cavity and capable of facilitating fluid flow in the hollow cavity,
   wherein:
   the gas pipeline is in communication with the hollow cavity by the filter layer, with the filter layer preventing the particles from entering the gas pipeline;
   the grabbing member is made of a flexible material, permitting the grabbing member to expand when inflated by gas, and then recess according to a shape of a surface of the object after the grabbing member contacts the object and upon deflation by the removal of the gas; and
   the particles have a flexible state and a rigid state, wherein the particles maintain the flexible state when the grabbing member is inflated, and the particles are pressed into the rigid state when deflated and the grabbing member is recessed; and
   the connection member comprises:
   a connection flange,
   a connection lid, and
   a connection cover;
   wherein:
   the connection flange, the connection lid and the connection cover are successively connected,
   the grabbing member is partially located in the connection cover and the connection lid, and
   the filter layer is located in the connection lid.

2. The grabbing device according to claim 1, wherein a portion of the grabbing member along an outside of the connection base is spherical.

3. The grabbing device according to claim 1, wherein the grabbing member is made of silica gel material.

4. The grabbing device according to claim 1, wherein the particles are micro-sized particles.

5. The grabbing device according to claim 1, wherein the filter layer is a filter diaphragm.

6. The grabbing device according to claim 1, wherein the connection base further comprises a pressure ring provided in the connection lid for securing the filter layer.

7. The grabbing device according to claim 1, wherein:
   the object being grabbed has irregular surfaces; and when the grabbing member is deflated into its recessed position, portions of the grabbing member become embedded into recesses on the surfaces of the object.

* * * * *